United States Patent
Flosbach et al.

(10) Patent No.: US 7,071,242 B2
(45) Date of Patent: Jul. 4, 2006

(54) PROCESS FOR THE PRODUCTION OF POLYURETHANE DI(METH)ACRYLATES

(75) Inventors: Carmen Flosbach, Wuppertal (DE); Stefanie Matten, Wuppertal (DE)

(73) Assignee: E. I. duPont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/963,907

(22) Filed: Oct. 13, 2004

(65) Prior Publication Data
US 2006/0079659 A1    Apr. 13, 2006

(51) Int. Cl.
*C08G 18/30* (2006.01)
(52) U.S. Cl. .............................. 522/90; 528/49; 528/75; 526/301; 252/182.18; 560/25; 560/115
(58) Field of Classification Search ................ 528/49, 528/75; 522/90; 526/301; 252/182.18; 560/25, 115
See application file for complete search history.

(56) References Cited

U.S. PATENT DOCUMENTS 5,300,615 A * 4/1994 Meixner et al. .............. 528/49
2005/0187341 A1    8/2005 Flosbach et al.

FOREIGN PATENT DOCUMENTS

WO          95/35332    * 12/1995
WO      WO0125306       4/2001

OTHER PUBLICATIONS

Copending U.S. Appl. No. 10/782,098, filed Feb. 19, 2004.
Copending U.S. Appl. No. 10/925,843, filed Aug. 25, 2004.
Copy of the PCT international Search Report and the Written Opinion of the International Searching Authority, No. PCT/US2005/036765, mailed Jan. 31, 2006.

* cited by examiner

*Primary Examiner*—Rachel Gorr
(74) *Attorney, Agent, or Firm*—Steven C. Benjamin

(57) ABSTRACT

A process for the production of polyurethane di(meth) acrylates in which a diisocyanate component, a diol component and hydroxy-C2–C4-alkyl (meth)acrylate in the molar ratio $x:(x-1):2$ are reacted without solvent and without subsequent purification operations, wherein x means any desired value from 2 to 5, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein the diol component comprises no more than four different diols, and 20 to 100 mol % of the diol component is formed by at least one linear aliphatic alpha,omega-C2–C12-diol, and 0 to 80 mol % by at least one (cyclo)aliphatic diol that is different from linear aliphatic alpha,omega-C2–C12-diols, wherein each diol of the diol component forms at least 10 mol % within the diol component, and wherein the mol % of the respective diols add up to 100 mol %.

12 Claims, No Drawings

PROCESS FOR THE PRODUCTION OF POLYURETHANE DI(METH)ACRYLATES

BACKGROUND OF THE INVENTION

The present invention relates to a process for the production of polyurethane di(meth)acrylates, to the polyurethane di(meth)acrylates produced by the process according to the invention and to powder coating compositions (powder coatings) which contain the polyurethane di(meth)acrylates as binders.

DESCRIPTION OF THE PRIOR ART

Polyurethane (meth)acrylates suitable as binders for the production of powder coating compositions are known from WO 01/25306. They are produced by reacting at least one linear aliphatic diisocyanate, at least one aliphatic compound with at least two isocyanate-reactive functional groups and/or water and at least one olefinically unsaturated compound with an isocyanate-reactive functional group. WO 01/25306 recommends performing the reaction in an organic solvent or solvent mixture which is not isocyanate-reactive. The polyurethane (meth)acrylate may then be obtained by evaporation and/or crystallization and/or recrystallization. All the syntheses described in the Examples section of WO 01/25306 proceed in methyl ethyl ketone as the inert solvent, followed by 12 hours cooling at 3° C. of the resultant product solution, from which polyurethane acrylate is isolated as a precipitated solid by suction filtration, washing and vacuum-drying.

While reacting in the presence of the organic solvent does indeed yield products usable as powder coating binders, it is disadvantageous in various respects. The solvent must be completely separated from the product to be used as powder coating binder. Yield is reduced by the purification operations.

Replication of the examples from WO 01/25306 in the absence of organic solvent is problematic either because excessively high melting temperatures must be used, resulting in the risk of thermal free-radical polymerization of the olefinic double bonds, or because products are obtained which are not suitable as powder coating binders because their melting point or melting range is too high or too low. Excessively low melting temperatures do not permit processing to form a powder coating; grinding, for example, is made more difficult or impossible. Excessively high melting temperatures are, for example, incompatible with powder coating processes which comprise a curing process in which lower melting temperatures are specified. Excessively high melting temperatures also often have a negative impact on levelling of the powder coating in the molten state during the curing process.

There was a desire to develop a process for the production of polyurethane (meth)acrylates that are suitable for use as powder coating binders which avoid the above disadvantages.

The process according to the invention was accordingly developed, which proceeds in the absence of solvents and without loss of yield and provides polyurethane di(meth) acrylates which, even without purification, may successfully be used as powder coating binders.

SUMMARY OF THE INVENTION

The novel process of this invention comprises a process for the production of polyurethane di(meth)acrylates in which a diisocyanate component, a diol component and hydroxy-C2–C4-alkyl (meth)acrylate, preferably hydroxy-C2–C4-alkyl acrylate, in the molar ratio x:(x−1):2 are reacted without solvent and without subsequent purification operations, wherein x means any desired value from 2 to 5, preferably from 2 to 4, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein the diol component comprises no more than four different diols, and 20 to 100 mol % of the diol component is formed by at least one linear aliphatic alpha,omega-C2–C12-diol, and 0 to 80 mol % by at least one (cyclo)aliphatic diol that is different from linear aliphatic alpha,omega-C2–C12-diols, wherein each diol of the diol component forms at least 10 mol % within the diol component, and wherein the mol % of the respective diols add up to 100 mol %.

DETAILED DESCRIPTION OF THE EMBODIMENTS

In the process according to the invention, diisocyanate component, diol component and hydroxy-C2–C4-alkyl (meth)acrylate are reacted stoichiometrically with one another in the molar ratio x mol diisocyanate:x−1 mol diol:2 mol hydroxy-C2–C4-alkyl (meth)acrylate, wherein x represents any value from 2 to 5, preferably from 2 to 4. At values of x>5, it is often necessary to use synthesis temperatures which are so high that there is a risk of free-radical polymerization during the synthesis and/or products are obtained which, with regard to use as powder coating binders, have excessively high melting points or ranges, for example, above 120° C. Moreover, it is, in general, not possible to achieve adequate crosslink density with powder coatings formulated with polyurethane di(meth)acrylates as binders that have been produced at x>5.

50 to 80 mol % of the diisocyanate component used in the process according to the invention is formed by 1,6-hexane diisocyanate, and 20 to 50 mol % by one or two diisocyanates selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein if two diisocyanates are selected, each diisocyanate forms at least 10 mol % of the diisocyanates of the diisocyanate component. Preferably, the diisocyanate or the two diisocyanates, forming in total 20 to 50 mol % of the diisocyanate component, are selected from dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

20 to 100 mol %, preferably, 80 to 100 mol %, of the diol component consisting of one to four, preferably, one to three, diols is formed by at least one linear aliphatic alpha, omega-C2–C12-diol, and 0 to 80 mol %, preferably, 0 to 20 mol %, by at least one (cyclo)aliphatic diol that is different from linear aliphatic alpha,omega-C2–C12-diols and preferably, also from alpha, omega-diols having more than 12 carbon atoms. Each diol of the diol component forms at least 10 mol % within the diol component.

Most preferably, the diol component does not comprise any diols that are different from linear aliphatic alpha, omega-C2–C12-diols, but rather consists of one to four, preferably, one to three, and in particular only one linear aliphatic alpha,omega-C2–C12-diol(s).

Examples of linear aliphatic alpha,omega-C2–C12-diols that may be used in the diol component include ethylene glycol, 1,3-propanediol, 1,4-butanediol, 1,5-pentanediol, 1,6-hexanediol, 1,10-decanediol and 1,12-dodecanediol.

Examples of (cyclo)aliphatic diols that are different from linear aliphatic alpha,omega-C2–C12-diols and may be used in the diol component include those isomers of propanediol and butanediol that are different from the isomers of propanediol and butanediol specified in the preceding paragraph, as well as, neopentyl glycol, butyl ethyl propanediol, the isomeric cyclohexanediols, the isomeric cyclohexanedimethanols, hydrogenated bisphenol A and tricyclodecanedimethanol.

If the diol component consists of more than one diol, the diols may be used as mixture in the synthesis process according to the invention, or the diols forming the diol component are in each case used individually during the synthesis. It is also possible to use a portion of the diols as a mixture and the remaining fraction(s) in the form of pure diol.

Preferably, only one hydroxy-C2–C4-alkyl (meth)acrylate is used in the process according to the invention. Examples of hydroxy-C2–C4-alkyl (meth)acrylates are hydroxyethyl (meth)acrylate, one of the isomeric hydroxypropyl (meth)acrylates or one of the isomeric hydroxybutyl (meth)acrylates; the acrylate compound is preferred in each case.

In the process according to the invention, the diisocyanates of the diisocyanate component, the diol or diols of the diol component and hydroxy-C2–C4-alkyl (meth)acrylate are reacted with one another in substance, i.e., in the absence of a solvent. The reactants may here all be reacted together simultaneously or in two or more synthesis stages. When the synthesis is performed in multiple stages, the reactants may be added in the most varied order, for example, also in succession or in alternating manner. For example, the diisocyanates of the diisocyanate component may be reacted first with hydroxy-C2–C4-alkyl (meth)acrylate and then with the diol or diols of the diol component, or first with the diol or diols of the diol component and then with hydroxy-C2–C4-alkyl (meth)acrylate. However, the diol component may also be divided into two or more partial amounts, for example, or into the individual diols, for example, such that the diisocyanates are reacted first with a portion of the diol component, prior to the further reaction with hydroxy-C2–C4-alkyl (methyl)acrylate, and finally with the remaining proportion of the diol component, for example. Equally, however, the diisocyanate component may also be divided into two or more partial amounts, for example, or into the individual diisocyanates, for example, such that the hydroxyl components are reacted first with a portion of the diisocyanate component and finally with the remaining proportion of the diisocyanate component, for example. The individual reactants may in each case be added in their entirety or in two or more portions.

The reaction is exothermic and proceeds at a temperature above the melting temperature of the reaction mixture, but below a temperature, which results in free-radical polymerization of the (meth)acrylate double bonds.

The reaction temperature is, for example, 60 to a maximum of 120° C. The rate of addition or quantity of reactants added is accordingly determined on the basis of the degree of exothermy and the liquid (molten) reaction mixture may be maintained within the desired temperature range by heating or cooling.

Once the reaction is complete and the reaction mixture has cooled, solid polyurethane di(meth)acrylates with calculated molar masses in the range from 628 or higher, for example, up to 2000, are obtained. The polyurethane di(meth)acrylates assume the form of a mixture exhibiting a molar mass distribution. The polyurethane di(meth)acrylates do not, however, require working up and may be used directly as a powder coating binder. Their melting temperatures are in particular in the range from 80 to 120° C.; in general, the melting temperatures are not sharp melting points, but instead the upper end of melting ranges with a breadth of, for example, 30 to 90° C.

The polyurethane di(meth)acrylates may be used in powder coatings not only as the sole binder or as the main binder constituting at least 50 wt. % of the resin solids content, but also in smaller proportions as a co binder. The high acid resistance of the coating films applied and cured from the powder coatings is remarkable.

The powder coatings produced with the polyurethane di(meth)acrylates produced according to the invention as the powder coating binders may comprise powder coatings curable exclusively by the free-radical polymerization of olefinic double bonds, which cure thermally or by irradiation with high-energy radiation, in particular, UV radiation. They may, however, also comprise "dual-cure" powder coatings, which additionally cure by means of a further, in general thermally induced crosslinking mechanism.

Depending on the nature of the powder coatings, the resin solids content thereof may apart from the polyurethane di(meth)acrylates produced according to the invention also contain additional binders and/or crosslinking agents. The additional binders and/or crosslinking agents may here be curable thermally and/or by irradiation with high-energy radiation.

While thermally curable powder coatings contain thermally cleavable free-radical initiators, the powder coatings curable by UV irradiation contain photoinitiators.

Depending on the selected curing conditions (purely thermal curing or a combination of UV irradiation and thermal curing), dual-cure powder coatings may contain thermally cleavable free-radical initiators or photoinitiators.

Examples of thermally cleavable free-radical initiators are azo compounds, peroxide compounds and C—C-cleaving initiators.

Examples of photoinitiators are benzoin and derivatives thereof, acetophenone and derivatives thereof, such as, for example, 2,2-diacetoxyacetophenone, benzophenone and derivatives thereof, thioxanthone and derivatives thereof, anthraquinone, 1-benzoylcyclohexanol, organophosphorus compounds, such as, for example, acyl phosphine oxides.

The initiators for curing by free-radical polymerization are used, for example, in proportions of 0.1 to 7 wt. %, preferably of 0.5 to 5 wt. %, relative to the total of resin solids content and initiators. The initiators may be used individually or in combination.

Apart from the already stated initiators, the powder coatings may contain additional conventional coating additives, for example, inhibitors, catalysts, levelling agents, degassing agents, wetting agents, anticratering agents, antioxidants and light stabilizers. The additives are used in conventional amounts known to the person skilled in the art.

The powder coatings may also contain transparent pigments, color-imparting and/or special effect-imparting pigments and/or fillers (extenders), for example, corresponding a pigment plus filler: resin solids content ratio by weight in the range from 0:1 to 2:1. Examples of inorganic or organic color-imparting pigments are titanium dioxide, iron oxide pigments, carbon black, azo pigments, phthalocyanine pigments, quinacridone or pyrrolopyrrole pigments. Examples of special effect-imparting pigments are metal pigments, for example, made from aluminum, copper or other metals; interference pigments, such as, for example, metal oxide coated metal pigments, for example, titanium dioxide coated or mixed oxide coated aluminum, coated mica, such as, for example, titanium dioxide coated mica. Examples of usable fillers are silicon dioxide, aluminum silicate, barium sulfate, calcium carbonate and talcum.

The powder coatings may be produced using the conventional methods known to the person skilled in the art, in particular, for example, by extruding the powder coating, which has already been completely formulated by dry mixing of all the required components, in the form of a pasty melt, cooling the melt, performing coarse comminution, fine grinding and then sieving to the desired grain fineness, for example, to average particle sizes of 20 to 90 µm.

The powder coatings may be used for any desired industrial coating purpose and are applied using conventional methods, preferably by spraying. Substrates which may be considered are in particular not only metal substrates but also plastic parts, for example, also fibre-reinforced plastic parts. Examples are automotive bodies and body parts, such as, for example, body fittings.

The powder coatings preferably comprise powder clear coating compositions, which are used to produce an outer powder clear coat layer on a color- and/or special effect-imparting base coat layer. For example, a color- and/or special effect-imparting base coat layer may be applied onto automotive bodies provided with a conventional precoating and optionally cured and thereafter, a powder clear coat layer of the powder clear coating composition may be applied and cured. If the base coat layer is not cured before application of the powder clear coat, the powder clear coat is applied by the "wet-on-wet" process.

The method used to apply the powder coatings may be, for example, initially to apply the powder coating onto the particular substrate and to melt it by heating the applied powder coating to a temperature above the melting temperature, for example, in the range from 80 to 150° C. After melting with exposure to heat, for example, by convective and/or radiant heating, and an optionally provided phase to allow for levelling, curing may proceed by irradiation with high-energy radiation and/or by supply of thermal energy. UV radiation or electron beam radiation may be used as high-energy radiation. UV radiation is preferred.

The following examples illustrate the invention. As used below, "pbw" means parts by weight.

EXAMPLES

Examples 1a to 1i

Preparation of Polyurethane Diacrylates for Comparison Purposes

Polyurethane diacrylates were produced by reacting 1,6-hexane diisocyanate with diols and hydroxyalkyl acrylate in accordance with the following general synthesis method:

1,6-hexane diisocyanate (HDI) was initially introduced into a 2 liter four-necked flask equipped with a stirrer, thermometer and column and 0.1 wt. % methylhydroquinone and 0.01 wt. % dibutyltin dilaurate, in each case relative to the initially introduced quantity of HDI, were added. The reaction mixture was heated to 60° C. Hydroxyalkyl acrylate was then apportioned in such a manner that the temperature did not exceed 80° C. The reaction mixture was stirred at 80° C. until the theoretical NCO content had been reached. Once the theoretical NCO content had been reached, the diols A, B, C were added one after the other, in each case in a manner such that a temperature of 75 to 120° C. was maintained. In each case, the subsequent diol was not added until the theoretical NCO content had been reached. The reaction mixture was stirred at 120° C. until no free isocyanate could be detected. The hot melt was then discharged and allowed to cool.

The melting behavior of the resultant polyurethane diacrylates was investigated by means of DSC (differential scanning calorimetry, heating rate 10 K/min).

Comparative examples 1a to 1i are shown in Table 1. The Table states which reactants were reacted together in what molar ratios and the result which was achieved. In particular, the final temperature of the melting process measured by DSC is stated in ° C.

TABLE 1

| Example | Moles HDI | Moles Hydroxyalkyl acrylate | Moles Diol A | Moles diol B | Moles diol C | Results |
|---------|-----------|------------------------------|---------------|---------------|---------------|---------|
| 1a | 2 | 2 HEA | 0.8 NPG | 0.2 HEX | | 90° C.; grindable chilled |
| 1b | 3 | 2 HEA | 1.7 NPG | 0.3 HEX | | 88° C.; grindable chilled |
| 1c | 3 | 2 HEA | 1.5 NPG | 0.5 HEX | | 99° C.; grindable |
| 1d | 4 | 2 HEA | 2.2 NPG | 0.8 HEX | | 100° C.; grindable |
| 1e | 3 | 2 HBA | 0.7 MPD | 0.7 PENT | 0.6 DEK | 117° C.; grindable |
| 1f | 3 | 2 HBA | 1 CHDM | 1 PROP | | 118° C.; grindable |
| 1g | 3 | 2 HBA | 1.3 CHDM | 0.7 PENT | | 120° C.; grindable |
| 1h | 3 | 2 HPA | 1 CHDM | 0.5 PROP | 0.5 PENT | 118° C.; grindable |
| 1i | 3 | 2 HPA | 0.6 HEX | 0.7 PENT | 0.7 PROP | 112° C.; grindable |

HDI: 1,6-hexane diisocyanate
HBA: 4-hydroxybutyl acrylate
HEA: hydroxyethyl acrylate
HPA: 2-hydroxypropyl acrylate
CHDM: 1,4-cyclohexanedimethanol
DEK: 1,10-decanediol
HEX: 1,6-hexanediol
MPD: 2-methyl-1,3-propanediol
NPG: neopentyl glycol
PENT: 1,5-pentanediol
PROP: 1,3-propanediol

Examples 2a to 2f

Preparation According to the Invention of Polyurethane Diacrylates

Polyurethane diacrylates were produced by reacting 1,6-hexane diisocyanate, additional diisocyanate, diol component and hydroxy-C2-C4-alkyl acrylate in accordance with the following general synthesis method:

1,6-hexane diisocyanate (HDI) as well as additional diisocyanate were initially introduced into a 2 liter four-necked flask equipped with a stirrer, thermometer and column and 0.1 wt. % methylhydroquinone and 0.01 wt. % dibutyltin dilaurate, in each case relative to the initially introduced quantity of diisocyanate, were added. The reaction mixture was heated to 60° C. Hydroxyalkyl acrylate was then apportioned in such a manner that the temperature did not exceed 80° C. The reaction mixture was stirred at 80° C. until the theoretical NCO content had been reached. Once the theoretical NCO content had been reached, the diols A and, optionally, B were added one after the other, in each case in a manner such that a temperature of 75 to 120° C. was maintained. In each case, the subsequent diol was not added until the theoretical NCO content had been reached. The reaction mixture was stirred at 120° C. until no free isocyanate could be detected. The hot melt was then discharged and allowed to cool.

The melting behavior of the resultant polyurethane diacrylates was investigated by means of DSC (heating rate 10 K/min).

Examples 2a to 2f are shown in Table 2. The Table states which reactants were reacted together and in which molar ratios and the result which was achieved. In particular, the final temperature of the melting process measured using DSC is indicated in ° C.

TABLE 2

| Example | Moles HDI | Moles Diisocyanate A | Moles Diisocyanate B | Moles Hydroxyalkyl acrylate | Moles Diol A | Moles Diol B | Results |
|---|---|---|---|---|---|---|---|
| 2a | 2 | 1 MDI | | 2 HBA | 2 PENT | | 120° C.; grindable |
| 2b | 1.5 | 1.5 MDI | | 2 HBA | 2 PENT | | 115° C.; grindable |
| 2c | 3 | 2 IPDI | | 2 HEA | 3 NPG | 1 HEX | 120° C.; grindable |
| 2d | 3 | 1 IPDI | | 2 HEA | 2 NPG | 1 PROP | 110° C.; grindable |
| 2e | 2 | 1 DCMDI | | 2 HEA | 0.8 PROP | 1.2 PENT | 95° C.; grindable |
| 2f | 2 | 0.5 MDI | 0.5 DCMDI | 2 HEA | 2 PENT | | 112° C.; grindable |

MDI: Diphenylmethane diisocyanate
IPDI: Isophorone diisocyanate
DCMDI: Dicyclohexylmethane diisocyanate
For the other abbreviations, Cf. Table 1

Examples 3a to 3p

Powder coating compositions were prepared, applied and cured with the polyurethane diacrylate binders of examples 1a to 1i and with the polyurethane diacrylate binders of examples 2a to 2f using the following general instructions:

A comminuted mixture of the following components was premixed and extruded

| | |
|---|---|
| 96.5 | pbw of one of the polyurethane diacrylates of Examples 1a to 1i or of one of the polyurethane diacrylates of Examples 2a to 2f, |
| 1 | pbw of Irgacure ® 2959 (photoinitiator from Ciba), |
| 0.5 | pbw of Powdermate ® 486 CFL (levelling additive from Troy Chemical Company), |
| 1 | pbw of Tinuvin ® 144 (HALS light stabilizer from Ciba) and |
| 1 | pbw of Tinuvin ® 405 (UV absorber from Ciba) | to produce a powder clear coat composition in conventional manner after cooling, crushing, grinding and sieving.

The respective powder clear coats were sprayed, in a layer thickness of 80 μm in each case, onto steel sheets coated with commercially available electrodeposition paint, filler and base coat (flashed off), melted for 10 min at 140° C. (oven temperature) and cured by UV irradiation corresponding to a radiation intensity of 500 mW/cm$^2$ and a radiation dose of 800 mJ/cm$^2$. The coatings obtained were investigated with respect to their acid resistance. For this purpose, 50 μl of 36% sulphuric acid were dropped onto the paint film for 30 minutes at intervals of one minute, at 65° C. (assessment: destruction of the film after X (0 to 30) minutes). The results are shown in Table 3.

TABLE 3

| Example | Binder example | Acid resistance (minutes) |
|---|---|---|
| 3a | 1a | 12 |
| 3b | 1b | 13 |
| 3c | 1c | 11 |
| 3d | 1d | 12 |
| 3e | 1e | 10 |
| 3f | 1f | 22 |
| 3g | 1g | 24 |
| 3h | 1h | 23 |
| 3i | 1i | 13 |
| 3k | 2a | 28 |
| 3l | 2b | >30 |
| 3m | 2c | >30 |
| 3n | 2d | >30 |
| 3o | 2e | 27 |
| 3p | 2f | 29 |

The powder clear coats prepared on the basis of the polyurethane diacrylate binders of examples 2a to 2f prove to be more acid resistant than the powder clear coats prepared on the basis of the polyurethane diacrylate binders of examples 1a to 1 i.

What is claimed is:

1. A process for the production of polyurethane di(meth) acrylates which comprises reacting a diisocyanate component, a diol component and hydroxy-C2–C4-alkyl (meth) acrylate in the molar ratio $x:(x-1):2$ without solvent and without subsequent purification operations, wherein x means any value from 2 to 5, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein the diol component comprises no more than four different diols, and 20 to 100 mol % of the diol component is formed by at least one linear aliphatic alpha,omega-C2–C12-diol, and 0 to 80 mol % by at least one (cyclo)aliphatic diol that is different from linear aliphatic alpha,omega-C2–C12-diols, wherein each diol of the diol component forms at least 10 mol % within the diol component, and wherein the mol % of the respective diols add up to 100 mol %.

2. The process of claim 1, wherein 80 to 100 mol % of the diol component comprises at least one linear aliphatic alpha, omega-C2–C12-diol, and 0 to 20 mol % by at least one (cyclo)aliphatic diol that is different from linear aliphatic alpha,omega-C2–C 12-diols.

3. The process of claim 1, wherein the diol component consists of one to four linear aliphatic alpha,omega-C2–C12-diols.

4. The process of claim 1, wherein the diol component consists of one linear aliphatic alpha,omega-C2–C12-diol.

5. Polyurethane di(meth)acrylates produced according to the process of claim 1.

6. Polyurethane di(meth)acrylates produced according to the process of claim 2.

7. Polyurethane di(meth)acrylates produced according to the process of claim 3.

8. Polyurethane di(meth)acrylates produced according to the process of claim 4.

9. Powder coating compositions comprising the polyurethane di(meth)acrylates produced according to the process of claim 1, as binders.

10. Powder coating compositions comprising the polyurethane di(meth)acrylates produced according to the process of claim 2, as binders.

11. Powder coating compositions comprising the polyurethane di(meth)acrylates produced according to the process of claim 3, as binders.

12. Powder coating compositions comprising the polyurethane di(meth)acrylates produced according to the process of claim 4, as binders.

* * * * *